US011729588B1

(12) United States Patent
Engelhart

(10) Patent No.: US 11,729,588 B1
(45) Date of Patent: Aug. 15, 2023

(54) STATELESS CHARGING AND MESSAGE HANDLING

(71) Applicant: T-Mobile USA, Inc., Bellevue, WA (US)

(72) Inventor: Robert Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 119 days.

(21) Appl. No.: 17/491,376

(22) Filed: Sep. 30, 2021

(51) Int. Cl.
*H04W 4/24* (2018.01)
*H04W 4/12* (2009.01)
*H04W 48/02* (2009.01)
*H04L 67/146* (2022.01)
*H04W 8/18* (2009.01)

(52) U.S. Cl.
CPC ............. *H04W 4/24* (2013.01); *H04L 67/146* (2013.01); *H04W 4/12* (2013.01); *H04W 8/18* (2013.01); *H04W 48/02* (2013.01)

(58) Field of Classification Search
None
See application file for complete search history.

(56) References Cited

U.S. PATENT DOCUMENTS

| | | | |
|---|---|---|---|
| 5,195,126 A | 3/1993 | Carrier et al. | |
| 5,287,270 A | 2/1994 | Hardy et al. | |
| 5,751,792 A | 5/1998 | Chau et al. | |
| 5,771,354 A | 6/1998 | Crawford | |
| 5,987,498 A | 11/1999 | Athing et al. | |
| 6,115,040 A | 9/2000 | Bladow et al. | |
| 6,185,414 B1 | 2/2001 | Brunner et al. | |
| 6,222,536 B1 | 4/2001 | Kihl et al. | |
| 6,317,484 B1 | 11/2001 | Mcallister | |
| 6,330,079 B1 | 12/2001 | Dugan et al. | |
| 6,363,411 B1 | 3/2002 | Dugan et al. | |
| 6,496,689 B1 | 12/2002 | Keller et al. | |
| 6,496,690 B1 | 12/2002 | Cobo et al. | |
| 6,567,657 B1 | 5/2003 | Holly et al. | |
| 6,628,954 B1 | 9/2003 | Mcgowan et al. | |

(Continued)

FOREIGN PATENT DOCUMENTS

| | | |
|---|---|---|
| EP | 1295460 A2 | 2/1919 |
| EP | 0018938 A1 | 11/1980 |

(Continued)

OTHER PUBLICATIONS

Cai_WO_2007-002577_A1.pdf (Year: 2007).*
Yang_WO_2019-015750_A1.pdf (Year: 2019).*

*Primary Examiner* — Jinsong Hu
*Assistant Examiner* — Alexander J Yi
(74) *Attorney, Agent, or Firm* — Perkins Coie LLP

(57) ABSTRACT

A method performed by a charging system includes receiving a message related to delivery of a service to an end user device. The charging system searches a local storage system to find a session identifier associated with the message. In response to determining that the session identifier is not at the local storage system, a backend storage system is queried for subscriber account data associated with the session identifier. As a result, despite the absence of the session identifier and associated subscriber account data at the local storage system, the charging system can grant service units for the end user device based on the subscriber account data retrieved from the backend storage system.

20 Claims, 8 Drawing Sheets

(56) References Cited

U.S. PATENT DOCUMENTS

| | | | |
|---|---|---|---|
| 6,636,504 B1 | 10/2003 | Albers et al. |
| 6,662,017 B2 | 12/2003 | Mccann et al. |
| 6,665,711 B1 | 12/2003 | Boyle et al. |
| 6,707,809 B1 | 3/2004 | Warrier et al. |
| 6,760,417 B1 | 7/2004 | Wallenius |
| 6,785,021 B1 | 8/2004 | Gordon et al. |
| 6,891,825 B1 | 5/2005 | Odell et al. |
| 6,910,074 B1 | 6/2005 | Amin et al. |
| 6,920,502 B2 | 7/2005 | Araujo et al. |
| 6,947,724 B2 | 9/2005 | Chaney |
| 6,957,255 B1 | 10/2005 | Schweitzer et al. |
| 6,963,579 B2 | 11/2005 | Suri |
| 6,970,693 B2 | 11/2005 | Madour et al. |
| 6,985,446 B1 | 1/2006 | Hurtta et al. |
| 6,986,157 B1 | 1/2006 | Fijolek et al. |
| 6,990,472 B2 | 1/2006 | Rosenhaft et al. |
| 6,999,478 B2 | 2/2006 | D |
| 7,013,001 B1 | 3/2006 | Felger |
| 7,020,130 B2 | 3/2006 | Krause et al. |
| 7,054,866 B2 | 5/2006 | Trivedi |
| 7,079,640 B2 | 7/2006 | Mikhailov et al. |
| 7,089,211 B1 | 8/2006 | Trostle et al. |
| 7,092,696 B1 | 8/2006 | Hosain et al. |
| 7,106,706 B1 | 9/2006 | Chaturvedi et al. |
| 7,116,968 B2 | 10/2006 | Koskinen et al. |
| 7,155,243 B2 | 12/2006 | Baldwin et al. |
| 7,197,122 B2 | 3/2007 | Vuori |
| 7,215,942 B1 | 5/2007 | Mcquaide et al. |
| 8,670,744 B2 * | 3/2014 | Hurtta | H04M 15/8038 455/406 |
| 2002/0037723 A1 | 3/2002 | Roach |
| 2002/0068545 A1 | 6/2002 | Oyama et al. |
| 2002/0122541 A1 | 9/2002 | Metcalf |
| 2002/0138427 A1 | 9/2002 | Trivedi |
| 2002/0147845 A1 | 10/2002 | Sanchez-herrero et al. |
| 2002/0165783 A1 | 11/2002 | Gonthier et al. |
| 2002/0172333 A1 | 11/2002 | Gross et al. |
| 2002/0176378 A1 | 11/2002 | Hamilton et al. |
| 2003/0016639 A1 | 1/2003 | Kransmo et al. |
| 2003/0059023 A1 | 3/2003 | Crockett et al. |
| 2003/0105812 A1 | 6/2003 | Flowers et al. |
| 2003/0130864 A1 | 7/2003 | Ho et al. |
| 2003/0233461 A1 | 12/2003 | Mariblanca-nieves et al. |
| 2004/0003048 A1 | 1/2004 | Stillman et al. |
| 2004/0078341 A1 | 4/2004 | Steichen |
| 2004/0098310 A1 | 5/2004 | Engelhart |
| 2004/0102182 A1 | 5/2004 | Reith et al. |
| 2004/0106393 A1 | 6/2004 | Chowdhury et al. |
| 2004/0122687 A1 | 6/2004 | Creamer et al. |
| 2004/0143523 A1 | 7/2004 | Pegaz-paquet et al. |
| 2004/0147245 A1 | 7/2004 | Kastelewicz et al. |
| 2004/0148363 A1 | 7/2004 | Hadi |
| 2004/0152443 A1 | 8/2004 | Koskinen et al. |
| 2004/0170257 A1 | 9/2004 | Gross et al. |
| 2004/0204063 A1 | 10/2004 | Van |
| 2005/0004822 A1 | 1/2005 | Elgrably |
| 2005/0009500 A1 | 1/2005 | Ear |
| 2005/0014483 A1 | 1/2005 | Lagerström |
| 2005/0044127 A1 | 2/2005 | Jaiswal et al. |
| 2005/0071319 A1 | 3/2005 | Kelley et al. |
| 2005/0086307 A1 | 4/2005 | Kelley et al. |
| 2005/0105704 A1 | 5/2005 | Harrison et al. |
| 2005/0177515 A1 | 8/2005 | Kalavade et al. |
| 2005/0191989 A1 | 9/2005 | Plush et al. |
| 2005/0195743 A1 | 9/2005 | Rochberger et al. |
| 2006/0020658 A1 | 1/2006 | Goodman et al. |
| 2006/0058010 A1 | 3/2006 | Williams et al. |
| 2006/0098624 A1 | 5/2006 | Morgan et al. |
| 2006/0116105 A1 | 6/2006 | Frankel et al. |
| 2006/0136557 A1 | 6/2006 | Schaedler et al. |
| 2006/0149845 A1 | 7/2006 | Malin et al. |
| 2006/0161616 A1 | 7/2006 | I et al. |
| 2006/0171369 A1 | 8/2006 | Strup et al. |
| 2006/0171380 A1 | 8/2006 | Chia |
| 2006/0178130 A1 | 8/2006 | Makrygiannis |
| 2006/0291455 A1 | 12/2006 | Katz et al. |
| 2007/0021118 A1 | 1/2007 | Ophir |
| 2007/0036167 A1 | 2/2007 | Hu |
| 2007/0060174 A1 | 3/2007 | Newton et al. |
| 2007/0064886 A1 | 3/2007 | Chiu et al. |
| 2007/0067385 A1 | 3/2007 | D et al. |
| 2007/0078986 A1 | 4/2007 | Ethier et al. |
| 2007/0094142 A1 | 4/2007 | Russell et al. |
| 2007/0103317 A1 | 5/2007 | Zellner et al. |

FOREIGN PATENT DOCUMENTS

| | | |
|---|---|---|
| EP | 0719066 A2 | 6/1996 |
| EP | 0823105 A2 | 2/1998 |
| EP | 0950308 A2 | 10/1999 |
| EP | 0999690 A1 | 5/2000 |
| EP | 1005737 A2 | 6/2000 |
| EP | 1014619 A1 | 6/2000 |
| EP | 1029402 A1 | 8/2000 |
| EP | 1125448 A1 | 8/2001 |
| EP | 0739526 B1 | 12/2001 |
| EP | 1163793 A2 | 12/2001 |
| EP | 1163803 A1 | 12/2001 |
| EP | 1166540 A2 | 1/2002 |
| EP | 1180298 A2 | 2/2002 |
| EP | 1183857 A1 | 3/2002 |
| EP | 1050157 B1 | 4/2002 |
| EP | 1214828 A2 | 6/2002 |
| EP | 1262076 A1 | 12/2002 |
| EP | 1274259 A1 | 1/2003 |
| EP | 1277149 A1 | 1/2003 |
| EP | 1290862 A2 | 3/2003 |
| EP | 1299844 A1 | 4/2003 |
| EP | 1323087 A1 | 7/2003 |
| EP | 1332632 A2 | 8/2003 |
| EP | 1352537 A1 | 10/2003 |
| EP | 1388039 A1 | 2/2004 |
| EP | 1389385 A2 | 2/2004 |
| EP | 1414211 A1 | 4/2004 |
| EP | 1417792 A1 | 5/2004 |
| EP | 1421798 A2 | 5/2004 |
| EP | 1436752 A1 | 7/2004 |
| EP | 1446755 A2 | 8/2004 |
| EP | 1451661 A1 | 9/2004 |
| EP | 1459496 A2 | 9/2004 |
| EP | 1123618 B1 | 10/2004 |
| EP | 1469653 A2 | 10/2004 |
| EP | 1470489 A2 | 10/2004 |
| EP | 1474766 A2 | 11/2004 |
| EP | 1478179 A1 | 11/2004 |
| EP | 1491026 A2 | 12/2004 |
| EP | 1493240 A2 | 1/2005 |
| EP | 1495629 A2 | 1/2005 |
| EP | 1496712 A1 | 1/2005 |
| EP | 1514211 A1 | 3/2005 |
| EP | 1518432 A1 | 3/2005 |
| EP | 1526678 A1 | 4/2005 |
| EP | 1533959 A1 | 5/2005 |
| EP | 1555800 A1 | 7/2005 |
| EP | 1557013 A2 | 7/2005 |
| EP | 1560368 A1 | 8/2005 |
| EP | 1571802 A1 | 9/2005 |
| EP | 1574034 A1 | 9/2005 |
| EP | 1583312 A1 | 10/2005 |
| EP | 1611754 A1 | 1/2006 |
| EP | 1619870 A2 | 1/2006 |
| EP | 1636662 A2 | 3/2006 |
| EP | 1649636 A1 | 4/2006 |
| EP | 1649710 A1 | 4/2006 |
| EP | 1665630 A1 | 6/2006 |
| EP | 1680885 A1 | 7/2006 |
| EP | 1681832 A1 | 7/2006 |
| EP | 1685462 A2 | 8/2006 |
| EP | 1748662 A1 | 1/2007 |
| EP | 1748667 A1 | 1/2007 |
| EP | 1772003 A1 | 4/2007 |
| EP | 1774748 A1 | 4/2007 |
| WO | 9111871 A2 | 8/1991 |
| WO | 9318606 A1 | 9/1993 |

(56) References Cited

FOREIGN PATENT DOCUMENTS

| | | | |
|---|---|---|---|
| WO | 9750225 | A2 | 12/1997 |
| WO | 9849819 | A1 | 11/1998 |
| WO | 9917515 | A1 | 4/1999 |
| WO | 0065773 | A2 | 11/2000 |
| WO | 0165402 | A2 | 9/2001 |
| WO | 0223768 | A1 | 3/2002 |
| WO | 0239693 | A2 | 5/2002 |
| WO | 2004027659 | A1 | 4/2004 |
| WO | 2004036373 | A2 | 4/2004 |
| WO | 2004071012 | A1 | 8/2004 |
| WO | 2005001640 | A2 | 1/2005 |
| WO | 2005022351 | A2 | 3/2005 |
| WO | 2005022893 | A2 | 3/2005 |
| WO | 2005027460 | A1 | 3/2005 |
| WO | 2005033841 | A2 | 4/2005 |
| WO | 2005041600 | A1 | 5/2005 |
| WO | 2005064851 | A1 | 7/2005 |
| WO | 2005066858 | A1 | 7/2005 |
| WO | 2005083933 | A1 | 9/2005 |
| WO | 2005103936 | A1 | 11/2005 |
| WO | 2005104519 | A1 | 11/2005 |
| WO | 2005125166 | A2 | 12/2005 |
| WO | 2006010335 | A1 | 2/2006 |
| WO | 2006031523 | A2 | 3/2006 |
| WO | 2006053814 | A2 | 5/2006 |
| WO | 2006058553 | A1 | 6/2006 |
| WO | 2006063536 | A1 | 6/2006 |
| WO | 2006066481 | A1 | 6/2006 |
| WO | 2006071474 | A2 | 7/2006 |
| WO | 2006093971 | A2 | 9/2006 |
| WO | 2006105223 | A1 | 10/2006 |
| WO | 2007024693 | A2 | 3/2007 |
| WO | 2007024874 | A2 | 3/2007 |
| WO | 2007033238 | A2 | 3/2007 |

* cited by examiner

502

Account Balance and Management Function (ABMF)

- Protocol Handling Frontend
- Rate Plan / Tariff
- Data Storage
- Account Maintenance Function
- Shared Account Management
- Provisioning Interface and Management
- Notifications
- OCCR/ CDR Generation

504

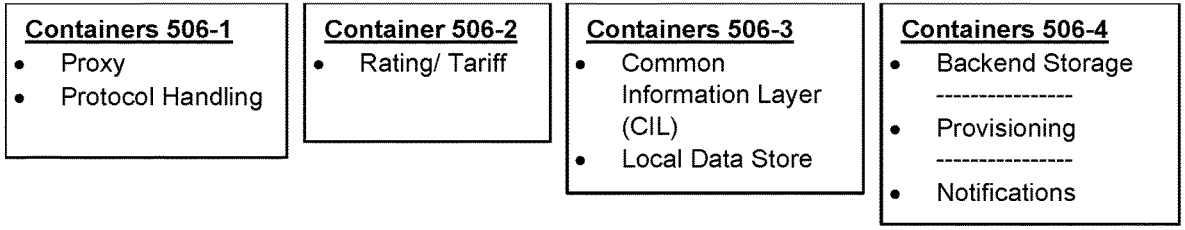

| Containers 506-1 | Container 506-2 | Containers 506-3 | Containers 506-4 |
|---|---|---|---|
| • Proxy<br>• Protocol Handling | • Rating/ Tariff | • Common Information Layer (CIL)<br>• Local Data Store | • Backend Storage<br>----------<br>• Provisioning<br>----------<br>• Notifications |

*FIG. 5*

STATELESS CHARGING AND MESSAGE HANDLING

BACKGROUND

In telecommunications, 5G is the fifth-generation technology standard for cellular networks, the successor to 4G networks, which provide connectivity to most current mobile phones. Like its predecessors, the service area of 5G networks is divided into geographic areas called cells. The wireless devices in a cell are connected to internet and telephone networks by radio waves through a local antenna of the cell. A main advantage of 5G networks is greater bandwidth, yielding higher communications speeds, eventually up to 10 gigabits per second (Gbit/s). Due to the increased bandwidth, 5G networks can also serve as general Internet service providers (ISPs) and will make possible new applications in internet-of-things (IoT) and machine-to-machine (M2M) technology areas.

Commercial deployment of 5G services is not possible without capabilities that are at least partially specified in 3GPP standards for network operators to monetize services. A charging system enables real-time control of a subscriber's consumption of 5G resources (e.g., for charging purposes) and/or metadata collection per wireless device for generating a charging data record (CDR). The charging system has a service-based interface (SBA) integrated into the overall 5G system, enabling deployments of charging functions (CHFs) in a virtualized environment. The CHF introduced in the 5G system architecture allows charging services to be offered to authorized network functions and/or devices. A converged online and offline charging procedure is also supported in 5G. The charging system can interface with existing billing systems (e.g., for 4G) to allow operators to preserve their billing environment. However, existing charging systems have a rigid architecture that causes latencies to access or use services, which is particularly problematic and noticeable in highspeed networks such as 5G.

BRIEF DESCRIPTION OF THE DRAWINGS

Detailed descriptions of implementations of the present invention will be described and explained through the use of the accompanying drawings.

FIG. 5 is a block diagram that illustrates an example of monolith refactorization.

Figure 1:
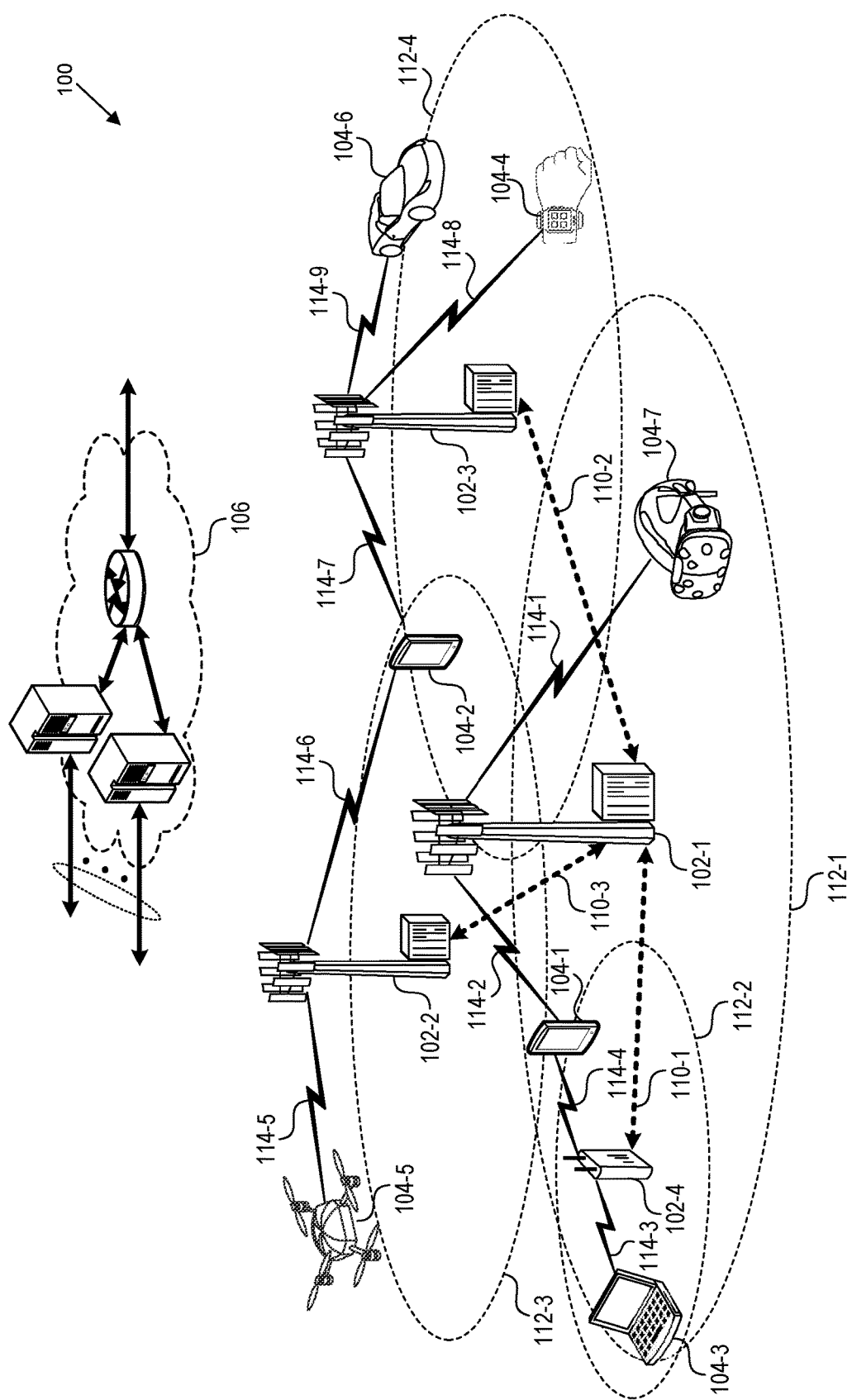
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to stateless charging and message handling. When a client requests a service, a message is received to create a session and maintain that session until terminated by the client. The disclosed technology can forego stateful message handling procedures required for session-based charging and instead processes messages independently at a nearest site.

Conventional charging procedures implement a monolith architecture. A monolith is a single-tiered application or service in which multiple applications or services are combined. Typically, monoliths that process multiple messages from clients are operable to handle multiple sessions at a given site. A site refers to a geographic or logical location including a datacenter or database configured to handle messages from subscribers of a telecommunications network.

The disclosed technology can refactorize the monolith architecture into multiple containers or microservices that have specialized functions. The term "refactorize," or the like, can refer to changing the factoring of components without changing the external behavior of the collective components. Microservices are typically small, messaging-enabled, bounded by contexts, autonomously developed, independently deployable, decentralized, and/or built and released with automated processes.

Containerization allows for continuous development, integration, and deployment of microservices that can independently perform specialized tasks, which were otherwise performed entirely by a monolith. Containerization, however, does not resolve a major drawback in message handling procedures. Specifically, session information is not replicated across multiple location sites because it is cost prohibitive. As such, latencies result when attempting to access services or data located at sites that are not local to a subscriber. For example, a given site may lack subscriber information required to handle a subscriber message. The missing information can result in session failures or latencies from retrieving data located at another site.

The disclosed technology transitions from session-based message handling to stateless message handling whereby containers at a given site process each message independently and unrelated to other messages. Different microservices at a site store and handle proxy, rating logic, and subscriber account data in a common information layer (CIL). Any request from a client can be sent to a nearest site based on a Network Repository Function (NRF) discovery or static routing.

In one example, microservices handle messages at a site by ignoring the states of the messages. The microservices access the CIL for subscriber account data. In the absence of subscriber account data at a local CIL, instead of rejecting the request, the local microservices processes the message. The microservices that are used, tasks performed by the microservices, data usage, and any relevant session information (e.g., collectively included in or related to "subscriber account data") are recorded and reported to a centrally located backend storage system (e.g., database) that stores volumes (e.g., all) subscriber account data. As used herein, a "backend storage system" or the like can refer to hardware and/or software that can be coupled to but separate and distinct from sites that include the charging nodes used to charge subscribers. In one example, the backend storage system includes a server or component thereof that is dedicated to collecting and processing subscriber account data or related information initially captured or recorded at different sites. In another example, a local storage system of a charging site can operate as a backend storage system for one or more other charging sites. As such, data stored on the backend storage system can be copied or transferred from the sites (e.g., datacenters) to the backend storage system and vice versa upon occurrence of an event, periodically, on demand, etc. The backend storage system can thus harmonize the subscriber account data across multiple sites to maintain consistent data that is current and accurate.

In one example, in the absence of the subscriber account data at the local CIL, the microservices can contact the backend database to update the local CIL with subscriber account data. After a session has terminated, account balance data that is stored at the backend database is updated with relevant session information. Alternatively, the account balance data is updated while a session is ongoing if the microservices handling the session contacts the backend database to update the local CIL with subscriber account data.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Figure 2:
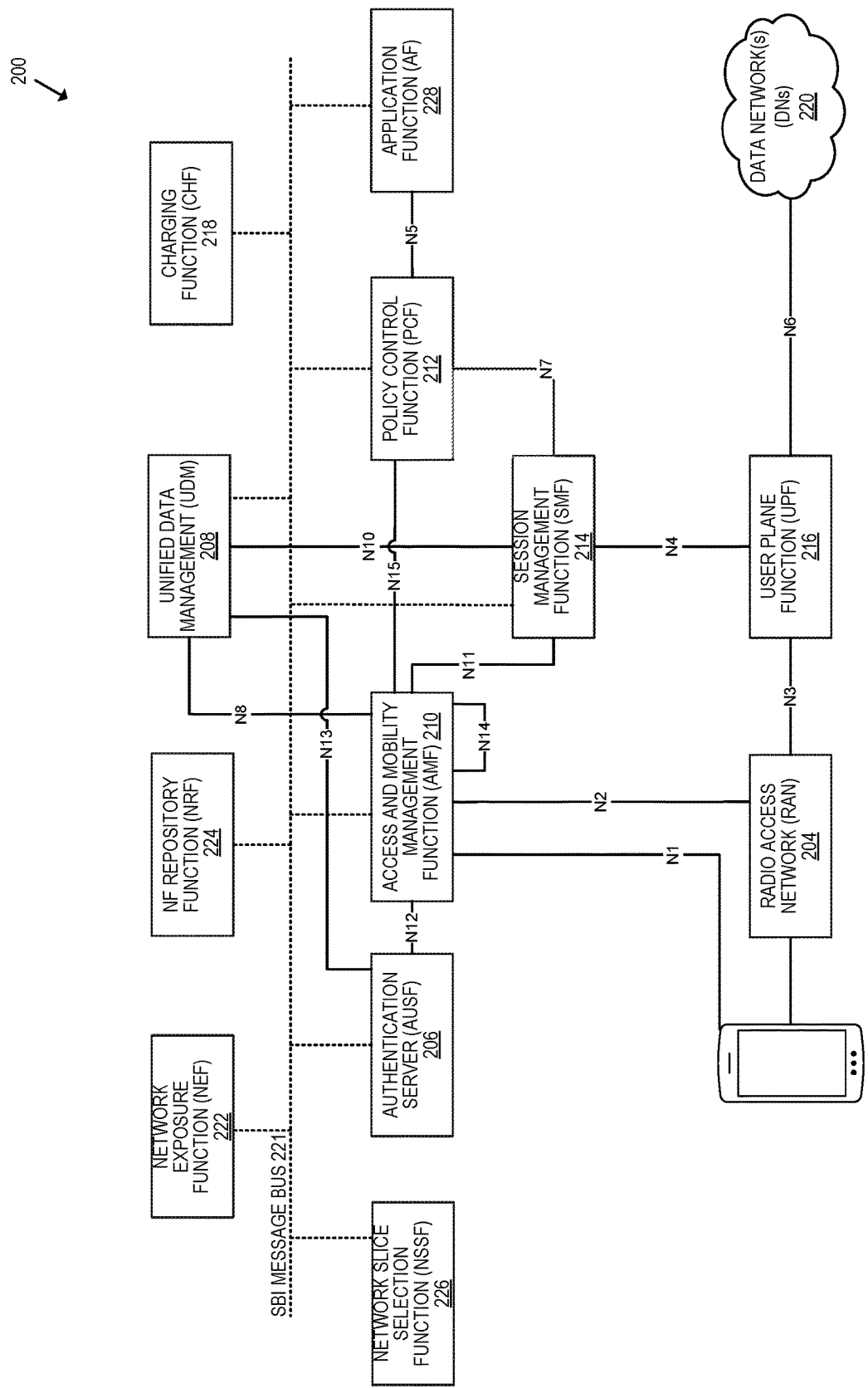
FIG. 2 is a block diagram that illustrates an architecture including network functions (NFs) of a 5G network that can implement aspects of the present technology.

FIG. 2 is a block diagram that illustrates an architecture 200 including network functions (NFs) of a 5G network that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Stateless Charging Architecture and Procedures

An online charging system (OCS) is a system that allows a telecommunications service provider to charge its customers, in real time, based on service usage. Charging information is normally stored persistently at one or more datacenters located at a site. A subscriber's account data can be stored at one or more fixed sites. A fixed site is designated by the network operator, which can depend on a subscriber's demographic information including a home address, zip code, or an area code associated with the subscriber's wireless device. Whenever a chargeable activity issues for the wireless device, irrespective of location, a wireless telecommunications network must check with a charging system of the home location to authorize the service, which can result in service latency that is particularly problematic in high-speed networks (e.g., 5G) and where the subscriber is physically distant from the fixed location of the account information.

Specifically, a network operator has datacenters located in different geographic sites. A datacenter of a particular site can serve any subscriber with a home location within or near the particular site. The datacenters include servers that support an OCS that includes a Charging Function (CHF). The CHF allows the network to charge subscribers in real-time based on service usage. However, the account information is stored only at the datacenter associated with the subscriber's home location (and possibly other fixed locations). Hence, the account information resides permanently and exclusively at least at the subscriber's home datacenter for use by the home CHF. Accordingly, every time a subscriber seeks to establish a data session from a local network, the local network must obtain authorization from a home CHF, irrespective of the location of the subscriber's wireless device.

The basic principles for offline and online charging are defined in 3GPP 32.240, 32.290, and 32.291, which include descriptions of current message format and handling procedures. There are generally two types of charging: (1) event-based charging and (2) session-based charging. Both can generate Charging Data Record (CDR), which can be transferred to a network node for the purpose of subscriber billing and/or inter-operator accounting. An event-based charging function (EBCF) is used to charge events based on their occurrence rather than their duration or volume. Typical events are SMS, MMS, or purchase of content (e.g., application, game, music, video on demand). A session-based charging function (SBCF) is responsible for online charging of network or user sessions (e.g., voice calls, IMS sessions). An Account Balance Management Function (ABMF) is the node of the OCS that includes a subscriber's account data (e.g., account balance).

The basic scenarios in online charging include (1) immediate event charging, (2) event charging with unit reservation, and (3) session charging with unit reservation. In a converged charging scenario, offline and online charging are applicable to a service delivery. The charging information of both offline and online charging can be provided in a single command. A trigger for reporting the charging information can be any triggers of the offline or online charging (deferred or immediate triggers). In one example, invoking a CDR at the start of a service can be done in either blocking mode or non-blocking mode. In blocking mode, service delivery is not started before authorization from the CHF. In non-blocking mode, service delivery can start before authorization from the CHF.

Figure 3:
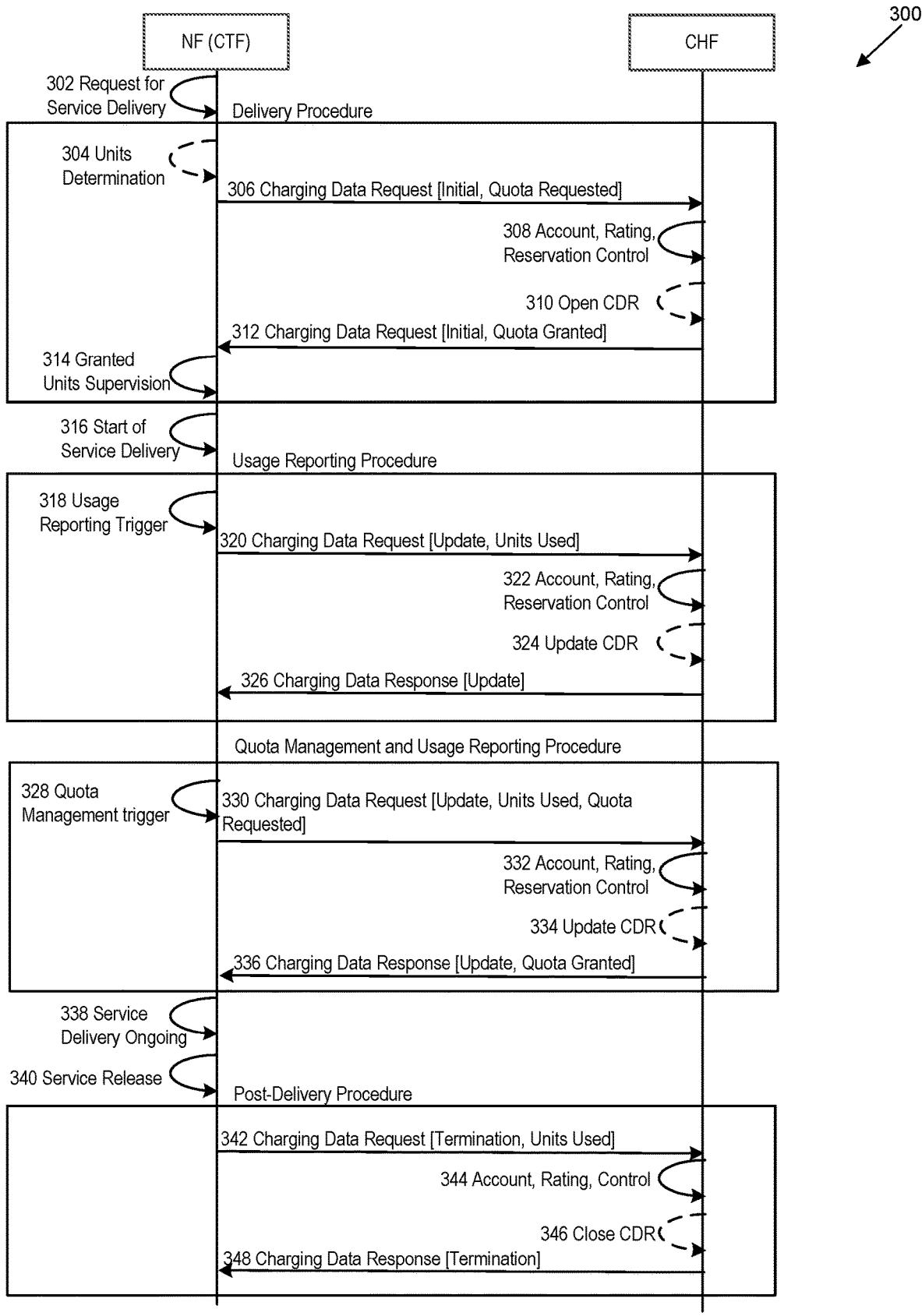
FIG. 3 is a flow diagram that illustrates basic principles of message handling in a session-based charging scenario.

FIG. 3 is a flow diagram that illustrates basic principles of message handling in a session-based charging scenario. The example illustrated is of a blocking mode scenario for SCUR with Unit Reservation, Decentralized and Centralized Unit Determination, Centralized Rating configuration, and subscriber's account deduction, where the Network Function (NF) Charing Trigger Function (CTF) invokes a converged charging service towards the CHF. The system first performs a delivery procedure. Specifically, at 302, a request to establish a session is received at the NF (CTF) from a requesting device. The request is for service delivery and to start service delivery. At 304, the NF (CTF) determines the number of service units depending on the service requested. As used herein, a "service unit" can refer to a standardized measure of consumption or use attributable to a service.

At 306, the NF (CTF) sends an initial request to inform the CHF about the service to be started including to reserve the number of service units if determined at 304 and can also report the used service units. At 308, the CHF rates the requests either based on the number of service units requested or on internal unit determination, and checks if corresponding funds can be reserved on the subscriber's account balance. If the account has sufficient funds, the CHF performs the corresponding reservation. At 310, the CHF opens a CDR related to the service, based on policies. At 312, the CHF responds by granting the reserved number of service units to the NF (CTF). At 314, the NF (CTF) monitors the consumption of the granted service units. At 316, the NF (CTF) starts service delivery.

The system then performs a usage reporting procedure. Specifically, at 318, the NF (CTF) generates charging data related to a delivered service that is not under a quota management. Based on that, a trigger for service usage reporting is met. At 320, the NF (CTF) reports the charging data related to the delivered service, including the used service units, to the CHF. At 322, the CHF uses the reported charging data to rate the usage and deduct the funds corresponding to the usage from the subscriber's account balance. At 324, the CHF updates the CDR with charging data related to the service. At 326, the CHF informs the NF (CTF) of the result of the request.

The system then performs quota management and a usage reporting procedure. Specifically, at 328, a trigger associated to quota management is met. Service units determination is performed when applicable. At 330, the NF (CTF) sends the request to the CHF for more service units to be granted for the service to continue and reporting the used units. At 332, like at 308, with the option to also deduct the funds corresponding to the usage on the account balance. At 334, based on policies, the CHF updates the CDR with charging data related to the service. At 336, the CHF grants quota to NF (CTF) for the service, with the reserved number of units. At 338, the NF (CTF) continues to deliver the service.

At 340, the NF (CTF) is requested to end the service delivery. As such, the system performs a post-delivery procedure. At 342, the NF (CTF) sends a request to the CHF, for charging data related to service termination with the final consumed units. At 344, the CHF performs the service termination process which involves using the reported charging data to rate the usage and deduct the funds corresponding to the usage on the account balance. At 346, based on policies, the CHF closes the CDR with charging data related to the service termination and the last reported service units.

As shown in FIG. 3, all charging data requests for the same stateful session go to the same CHF, which can be an individual CHF or a cluster. Session information is not shared across sites due to hardware costs and latency that results when accessing subscriber account data at other sites. Moreover, concerns have been raised about changes in protocol handling, account copying, provisioning, credits and debits, including the need to make unavailable allocated service units until they are reported used or credited.

The disclosed technology transforms session-based charging and message handling into stateless charging and message handling by refactorizing the charging architecture into a collapsed layered architecture. Session handling can be ignored while a client such as a SMF or Packet Gateway (PGW) maintains session-based signaling. Specifically, each message, whether to create, update, or terminate charging, is treated as an independent and unrelated message. In one implementation, a monolithic rating logic is refactorized into a containerized stateless rating service or microservices and separated from rating data (e.g., subscriber account data). Doing so minimizes implementation changes to enable speedy deployment. To maintain session-based signaling, the rating logic frontend protocol is replaced with a protocol such as an SBI on HTTP/2 protocol, which can minimize changes on the packet core. In another example, a stateless protocol supported by the charging node (e.g., CHF) can be used instead of the current SBI protocol to a stateless protocol; however, doing so could delay deployment due to refactoring and new deployment requirements. In some examples, messaging between the containerized charging system and the client follows other protocols such as Gy/Sy or Ro specifications.

The subscriber account data is stored at a common information layer (CIL) (e.g., Cassandra database or other data structure) for use by containerized microservices (or mini services, or macro services). Any message sent by a client is routed to a nearest site based on NRF discovery or other routing procedures. The messages are processed by the containerized services at the nearest site while ignoring a state of a related session. The subscriber account data is accessed from the CIL. As such, usage is simply deducted from an account balance and new granted service units are returned to the client.

The disclosed technology also provides multisite failure handling. For example, upon occurrence of a failure, a client can re-send the failed message to a new site with used service units and related information, and request new service units. Alternatively, the client could send failed session information to an offline processing system (e.g., offline or failure handling CHF), afterwards accessing a new site with a new session identifier. If subscriber account data is not currently stored at the new site, a containerized service can request the subscriber account data from the backend storage system (e.g., UDM, Cassandra database, or other repository) through most any supported access method and write that data into the local CIL. Note that the last message with the previous usage record is stored in the CIL. In one example, all subscriber account data updated in the CIL is synchronized with the backend database, where the actual subscriber balance and usage counters can be stored. From there, the subscriber account data is available for later use whenever subscriber account data is not found at a particular site.

Figure 4:
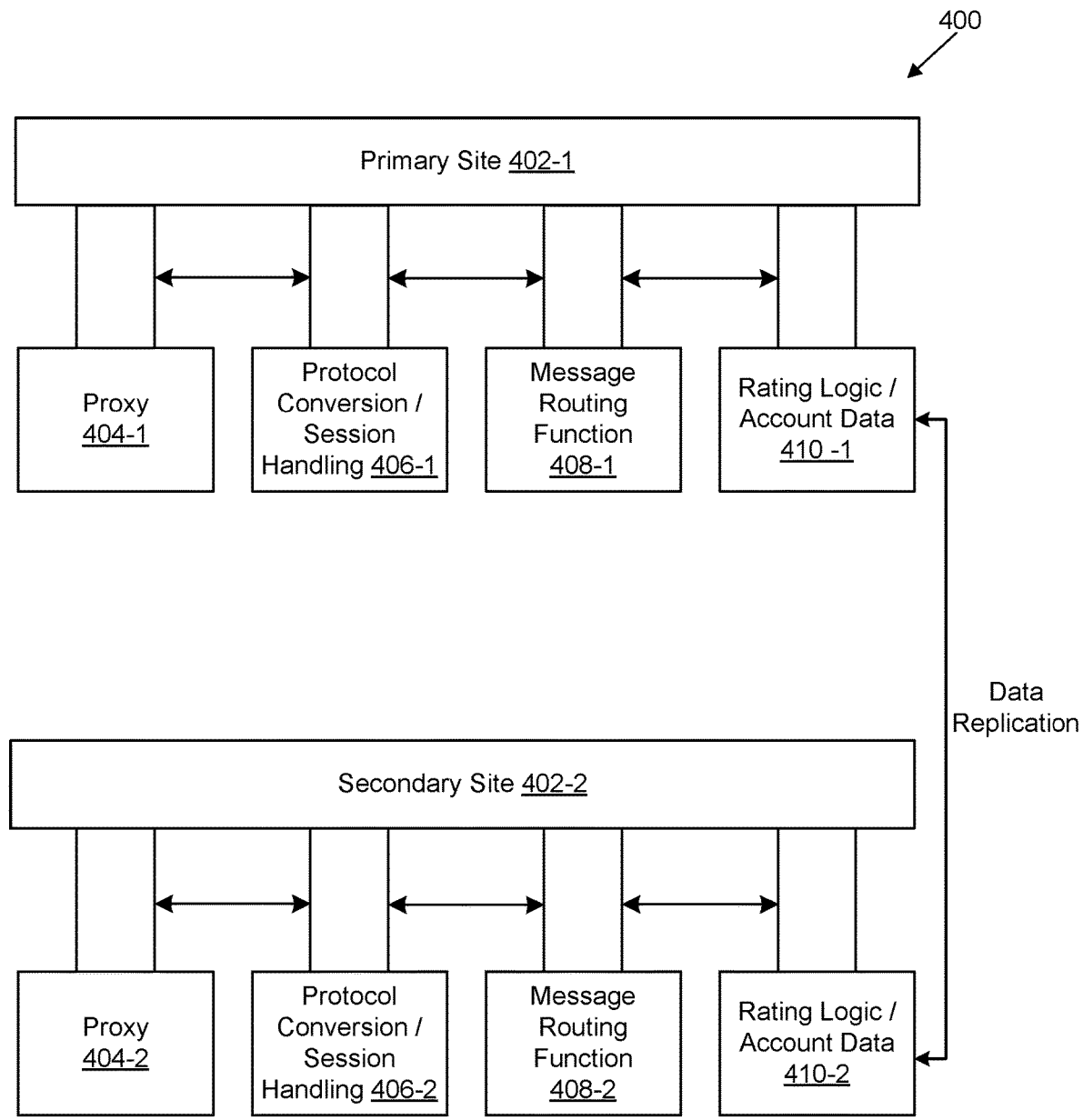
FIG. 4 is a block diagram that illustrates a monolith architecture for message handling in session-based charging.

FIG. 4 is a block diagram that illustrates a monolith architecture for message handling in session-based charging. The architecture 400 includes a primary site 402-1 and a secondary site 402-2 (collectively referred to as "sites 402"). The secondary site 402-2 can be a georedundant site that stores copies of subscriber account data for use if the primary site 402-1 fails. The sites of a network carrier may not all have georedundant sites. The sites are at different locations and include datacenters with monolith architectures that combine multiple functions.

The primary site 402-1 includes components that each constitute separate monolith applications that are deployed on the network to process multiple messages and handle multiple sessions. The components exchange messages to handle data, voice, and messaging applications. The components of the primary site 402-1 include a proxy component 404-1, a protocol conversion or session handling component 406-1, a routing function component 408-1, and a rating logic and subscriber account data component 410-1 (e.g., and ABMF). The rating logic and/or subscriber account data component 410-1 undergoes data replication to store copies at the rating logic and/or subscriber account data component 410-2 of the secondary site 402-2, which has components like the primary site 402-1 including a proxy component 404-2, a protocol conversion or session handling component 406-2, and a routing function component 408-2 in addition to the rating logic or account data component 410-2.

FIG. 5 is a block diagram that illustrates an example of monolith refactorization. The illustrated example refactorizes an ABMF into microservices that can operate independently and enable scalability. The monolith 502 is implemented on one or more virtual machines (VMs) of a network and includes a protocol handling frontend, rate plan or tariff data, and functions for data storage, account maintenance, shared account management, provisioning interface and management, notifications, and OCCR/CDR generation. The monolith 502 is refactorized into separate containers to operate more efficiently while maintaining the overall functionality from an external perspective. As shown, the container architecture 504 includes separate containers that are more cloud native compared to the VMs of the monolith 502. Thus, a carrier can realize a cloud-native architecture that is faster, at a lower cost and with greater simplicity, for 5G charging. As shown, there are containers 506-1 through 506-4 that include one or more microservices and can be arranged as PODS that share a common namespace. Examples include containers for proxy and protocol handling, separate from rating or tariff data, a CIL and local data store (e.g., for subscriber account data), and backend storage, provisioning, and notifications.

Figure 6:
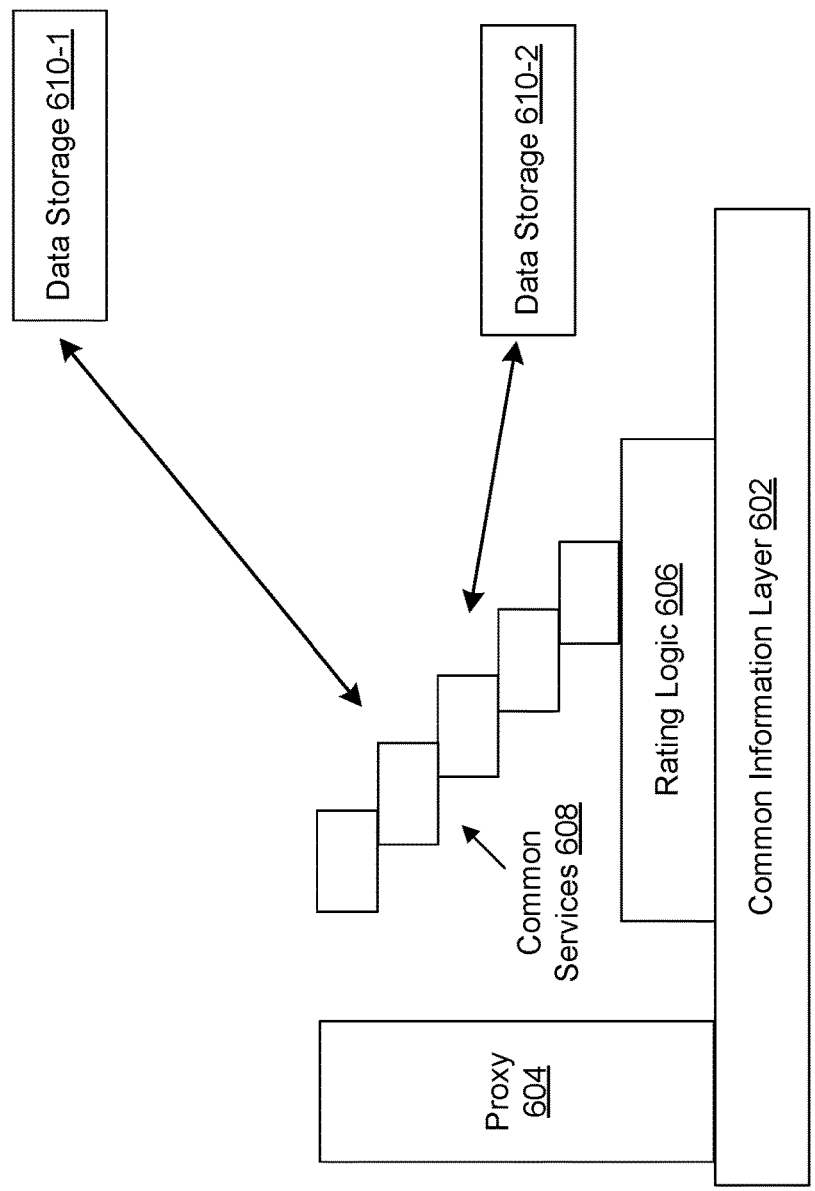
FIG. 6 is a block diagram that illustrates an example architecture for stateless charging and message handling.

FIG. 6 is a block diagram that illustrates an example architecture for stateless charging and message handling. The session-based charging and message handling is transformed into stateless charging and message handling by refactorizing the charging architecture into a collapsed layered architecture 600. The architecture 600 includes a CIL 602 that stores subscriber account data that is available to the local site. The architecture 600 includes a proxy 604 and ratings logic 606, which is containerized. The proxy 604 represents a common or one or more separate proxies per cluster. The common services 608 are for various or all service types (e.g., data, voice, messaging) embodied in a simpler, flatter, and more resilient architecture compared to a monolith architecture. The site can assess remote data storage systems 610-1 or 610-2. In one example, the data storage systems 610-1 or 610-2 are backend databases that are centralized among sites that perform message handling for a telecommunications system. The data storage systems 610-1 and 610-2 can thus store and harmonize subscriber account data among multiple charging nodes of a carrier.

The microservices that are used, tasks performed by the microservices, data usage, and any relevant session information can be reported and recorded and at a backend storage system (e.g., data storage systems 610-1 or 610-2), which can store all subscriber account data. The backend storage system provides replication and redundancy that could be in any desired form. Examples include hardware based (e.g., RAID), software based (e.g., Cassandra, ScaleIO), UDM, or the like. In the absence of subscriber account data at a local CIL (e.g., a local storage system), the microservices can contact the backend storage system to update the local CIL with subscriber account data. After a session has terminated, account balance data that is stored at the backend storage system is updated with relevant session information. Alternatively, the account balance data is updated while a session is ongoing if the microservices handling the session contacts the backend database to update the local CIL with subscriber account data.

The disclosed architecture enables message handling procedures that can ignore the fixed state of a session, which is closely coupled with a specific CHF; essentially foregoing the requirement to handle a session at the same site. The procedures introduced herein can handle messages (e.g., create, update, terminate) where session data is not available at the CIL and can clean-up stale session information. These procedures allow a session to be processed by any CHF without requiring the clients (e.g., network nodes, microservices) that sent the message to change anything on their side.

For example, for a new session, a charging system receives a message to create the session, which includes a session identifier. When the session identifier does not exist in the CIL, the charging system reserves service units based on a tariff, retrieves current subscriber account data from the backend storage system, and returns status information with granted service units. For an existing session, when the charging system finds the session identifier at the CIL, the charging system updates used service units and associated data stored at the CIL. The charging system can synchronize current subscriber account data and related data of the CIL with a backend storage system. If a terminate message is received, the system can remove session data saved at the CIL, generate a CDR, and stop the session. Alternatively, if an update message is received, the charging system can reserve more service units (if needed), retrieve current subscriber account data from the backend storage system and return status data along with granted service units. For an existing session, when the charging system does not find the session identifier at the CIL, the charging system can synchronize the used service units and other related data with the backend storage system.

The backend storage system stays current by retrieving the last granted and/or used service units and credits remaining and removing the session data and associated information saved in other charging nodes. In one example, the charging system provisions subscriber data, passes, and account balances through a containerized agent that interfaces with the backend storage system. The containerized agent could be collocated with the backend storage system or could be remotely located. The charging system can send notifications in different scenarios. In one scenario, the charging system checks whether session-based charging is available, thus dispensing with stateless message handling. In another scenario, the charging system performs account updates including balances, passes, end of bill cycle, etc. Notifications are generated by a microservice interfacing to the backend database, either locally or remotely, as needed.

In one implementation, the charging system performs shared account handling. In particular, shared accounts use the same account balance and the same update counters to handle multiple subscribers. Service units are reserved from subscriber account data located in the backend storage system. Once service units are reserved, they are not available to other subscribers on the same account. Essentially, a withdrawal is made from the account located in the backend storage system. Service units can be credited or debited by the local distributed rating and balance functions located at sites, other datacenters, clusters, or instances from the account information in the backend storage system.

An alternative implementation does not include a backend storage system. Instead, the subscriber account data is retrieved from a last site (e.g., CHF) that saved the data rather than a backend storage system. Such an implementation can track the location of the subscriber account data and session information in a separate system (e.g., using an account finder). However, the implementation only works when the data is accessible from the other site. That is, if the data is not available or accessible from the other site, this implementation will not function.

Figure 7:
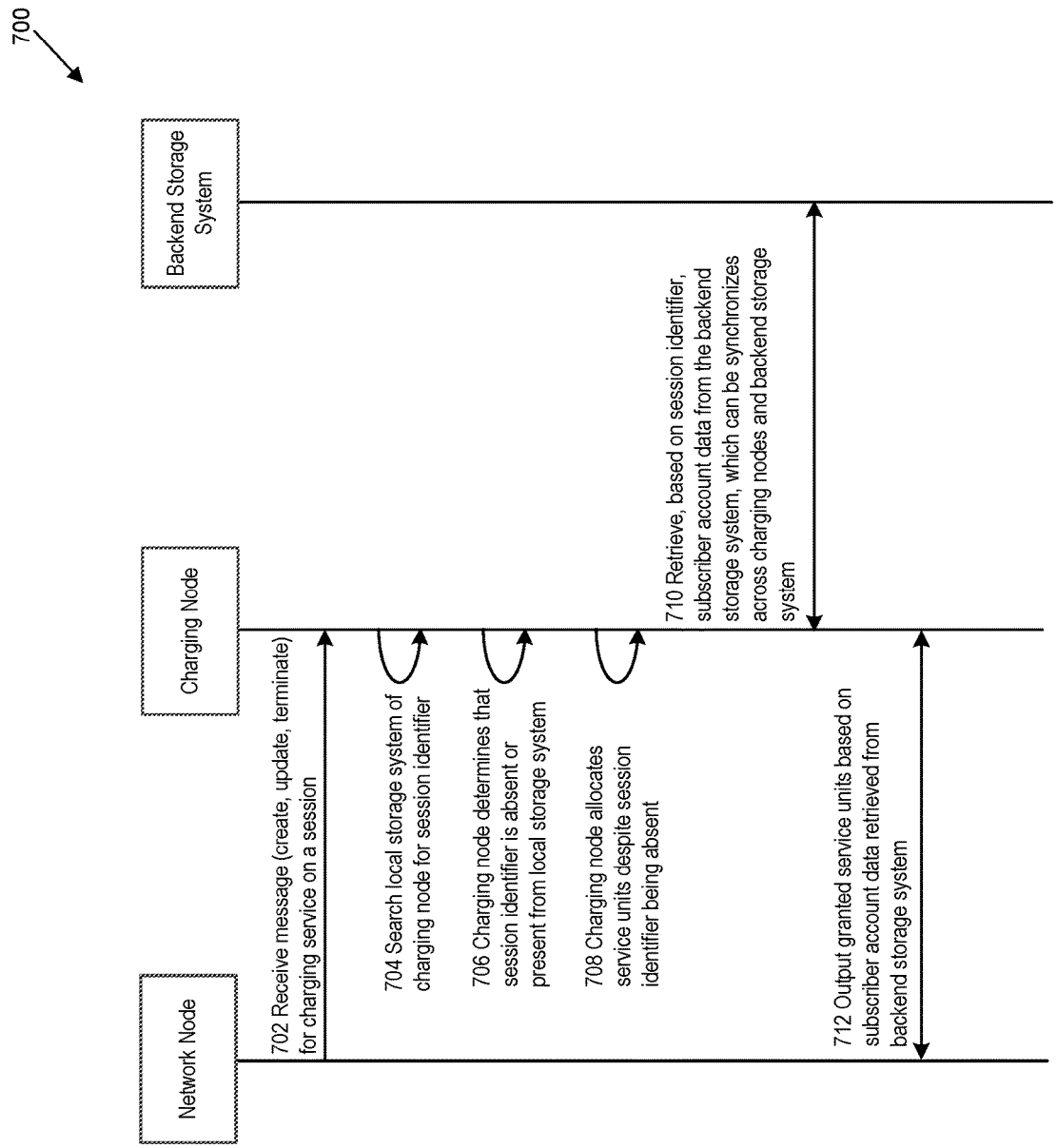
FIG. 7 is a flowchart that illustrates processes for stateless charging and message handling.

FIG. 7 is a flowchart that illustrates processes for stateless charging and message handling. The processes 700 are performed by one or more charging nodes (e.g., CHFs) of a charging system ("system") coupled to a backend storage system. The backend storage system is communicatively coupled to multiple charging nodes that are located at different geographic sites. The charging nodes can be configured for performing stateful session-based charging and/or stateless charging and message handling as described herein. The backend storage system collects and maintains subscriber account data obtained from the multiple disparately located charging nodes.

At 702, the system receives a message related to delivery of a service over the telecommunications network to an end user device (e.g., smartphone). The message can be to create, update, or terminate charging for a session. The message is sent from a network node or microservice to the charging node, which can be configured for stateful session-based charging but treat messages as being independent and unrelated, to provide stateless charging and message handling as well. For example, a create message includes an indication of a session identifier for a session on which a service is delivered to the end user device. The end user device is associated with a subscriber of the telecommunications network.

At 704, the system searches a local storage system of the charging node for the session identifier. An example of the local storage system is a CIL that is configured to store session data used for charging. The stored session identifiers are associated with records of subscriber account data (e.g., balance, passes, or bill cycles) for multiple subscribers.

At 706, the system determines that the session identifier is absent from the local storage system. Normally, session-based charging requires identifying the session identifier at the local storage system to grant service units for the service associated with the session. As such, when a session identifier is not found at the local storage system, the system would generate an error and deny the service. However, despite the absence of the session identifier and associated subscriber account data at the local storage system, the system can ignore a state of the session on which the service is delivered to the end user device and grant service units for the service based on the subscriber account data retrieved from the backend storage system by querying the backend storage system based on the session identifier, as follows.

At 708, in response to the session identifier being absent from the local storage system, the system reserves a number of service units based on a condition for providing the service to the subscriber. That is, the system would not necessarily prevent the end user device from consuming the service. For example, the system can reserve a number of service units based on a telecommunications tariff, where the telecommunications tariff is based on one or more terms or conditions for providing services to subscribers.

At 710, the system retrieves, based on the session identifier, subscriber account data from the backend storage system. For example, the charging node can send a message to the backend storage system, where the message includes an indication of the session identifier. The current subscriber account data for a subscriber can be found at the backend storage system based on a matching session identifier. The subscriber account data can be provisioned through a containerized agent interfacing the backend storage system, where the containerized agent is collocated with the backend storage system or remote from it.

The system can determine a number of used service units for the session identifier and synchronize the number of used service units across the local storage of the charging node and the backend storage system. Moreover, the backend storage system can cause other charging nodes to remove session identifier and/or any stale subscriber account data. The system can also synchronize the subscriber account data stored at the local storage system and the backend storage system so that both storage systems maintain current subscriber account data. The backend storage system can also manage session information on other charging nodes. For example, the backend storage system can cause other charging nodes to remove, replace, or add session or subscriber data.

In another example, the subscriber account data is shared among multiple subscribers. As such, the charging node can update counters that handle the subscriber account data of the multiple subscribers, reserve units for the subscriber based on the subscriber account data retrieved from the backend storage system and cause the backend storage system to deduct the reserve units from the subscriber account data. Hence, the reserved units are not available to other subscribers that share the subscriber account data.

At 712, the system outputs an indication of a number of granted service units for the end user device. The number of granted service units is determined based on the subscriber account data retrieved from the backend storage system. Moreover, the number of granted service units can define a threshold such that the service must be terminated, or additional service units must be requested upon, consumption of the number of granted service units. The system can communicate the indication of the number of granted service units to the network node and/or microservice that sent the message.

The system can save the session identifier and retrieved/updated subscriber account data at the local storage system of the charging node in association with the subscriber account data retrieved from the backend storage system. Once information about an existing session is saved at the local storage system, the system can process new messages (e.g., update, terminate) related to delivery of the service to the end user device. A new message would include an indication of the session identifier for the session on which the service is being delivered to the end user device. As such, the system would search the local storage system of the charging node for the session identifier as in 704. However, the system would find the session identifier and associated subscriber account data stored at the local storage system and, in response, update the associated subscriber account data to indicate a number of used service units. The system can retrieve updated subscriber account data from the backend storage system and output an indication of granted service units for the end user device, based on the updated subscriber account data. In another example, when a termination message is received, the charging node can respond by removing the subscriber account data stored at the local storage system, generating a charge record (e.g., CDR) for the session, and communicate the CDR to another network node that will charge the subscriber account.

In one implementation, a microservice that interfaces with the backend storage system can generate notifications for network nodes or administrators of the charging system. The microservice can be located at the charging node or remote from the charging node. For example, a notification can be generated regarding the state of a session or whether session-based charging is valid. In another example, a notification can be generated regarding associated subscriber account data such as whether the data is stale or current (e.g., based on timestamps associated with the data).

Computer System

Figure 8:
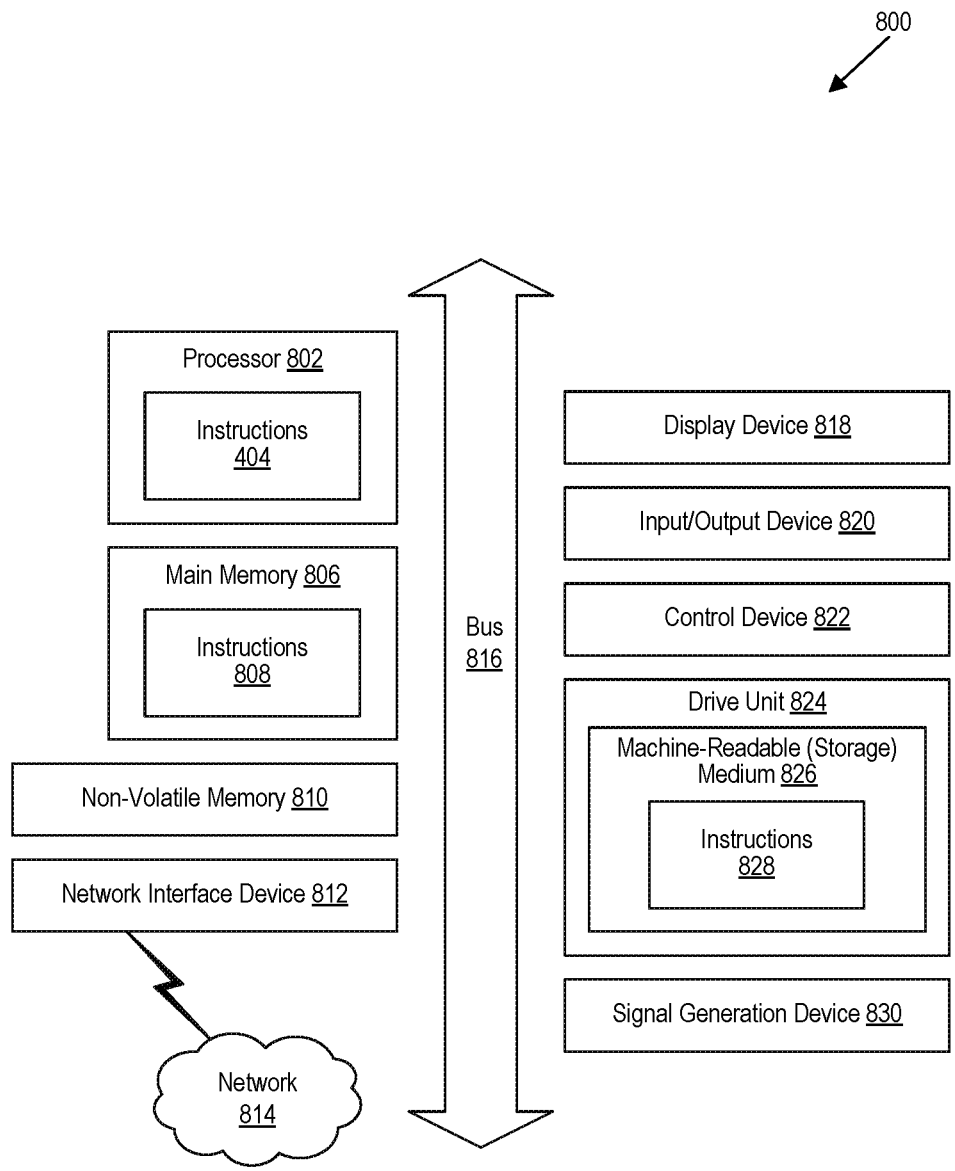
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention. Related concepts are described in U.S. patent application Ser. No. 17/209,075, titled "Dynamic Relocation of Account Information Based on Mobility of Wireless Device," filed Mar. 22, 2021, which is incorporated by reference in its entirety for all purposes.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory computer-readable storage medium carrying instructions, which, when executed by at least one data processor of a charging node of a telecommunications network, cause the charging node to:

receive, from a network node of the telecommunications network, a message related to delivery of a service over the telecommunications network to an end user device,
  wherein the message includes an indication of a session identifier for a session on which the service is delivered to the end user device, and
  wherein the end user device is associated with a subscriber of the telecommunications network;
search a local storage system of the charging node for the session identifier,
  wherein the local storage system is configured to store session identifiers for session-based charging, and
  wherein the session identifiers are associated with records of subscriber account data for multiple subscribers;
determine that the session identifier is absent from the local storage system of the charging node;
in response to the session identifier being absent from the local storage:
  ignore a state of the session on which the service is delivered to the end user device;
  reserve a number of service units based on a condition for providing the service to the subscriber,
    wherein a service unit corresponds to a standardized measure of consumption or use attributable to the service; and
  retrieve, based on the session identifier, subscriber account data from a backend storage system,
    wherein the backend storage system is communicatively coupled to multiple disparately located charging nodes that are configured for performing stateful and stateless charging,
    wherein the backend storage system maintains records of subscriber account data of multiple subscribers collected from the multiple disparately located charging nodes,
    wherein the charging node is one of multiple charging nodes of a charging system having a refactorized architecture including multiple containers that each include one or more microservices, and
    wherein the message is received by the charging node from a microservice; and
communicate, to the network node or the microservice, an indication of a number of granted service units for the end user device,
  wherein the number of granted service units is determined based on the subscriber account data retrieved from the backend storage system.

2. The non-transitory computer-readable storage medium of claim 1, wherein the message is a first message, and wherein the charging node is further caused to:

store the session identifier at the local storage of the charging node in association with the subscriber account data retrieved from the backend storage system;
receive a second message related to delivery of the service to the end user device,
  wherein the message includes an indication of the session identifier for the session on which the service is being delivered to the end user device;
search the local storage system of the charging node for the session identifier;
identify the session identifier and associated subscriber account data stored at the local storage system;
in response to identifying the session identifier stored at the local storage system:

update the associated subscriber account data to indicate a number of used service units for the service; and search the backend storage system for updated subscriber account data; and output an indication of a new number of granted service units for the end user device, wherein the new number of granted service units is determined based on the updated subscriber account data.

3. The non-transitory computer-readable storage medium of claim 1, wherein the charging node is further caused to:

store the session identifier at the local storage system of the charging node in association with the subscriber account data retrieved from the backend storage system;

receive a termination message related to terminating the service, wherein the termination message includes an indication of the session identifier for the session on which the service is being delivered to the end user device;

search the local storage system of the charging node for the session identifier;

identify the session identifier; and in response to identifying the session identifier stored at the local storage system:

remove the subscriber account data stored at the local storage of the charging node;

generate a charge record for the session; and communicate the charge record to a network node that sent the termination message to the charging node.

4. The non-transitory computer-readable storage medium of claim 1, wherein the number of granted service units define a threshold such that the service must be terminated or additional service units must be requested upon consumption of the number of granted service units.

5. The non-transitory computer-readable storage medium of claim 1, wherein to reserve the number of service units comprises causing the charging node to:

reserve a number of service units based on a telecommunications tariff, wherein the telecommunications tariff is based on the condition for providing the service to the subscriber.

6. The non-transitory computer-readable storage medium of claim 1, wherein the charging node is further caused to:

determine a number of used service units associated with the session identifier;

synchronize the number of used service units across the local storage system of the charging node and the backend storage system, wherein the backend storage system is caused to remove data associated with the session identifier from another charging node of the telecommunications system.

7. The non-transitory computer-readable storage medium of claim 1, wherein the charging node is caused to:

synchronize the subscriber account data stored at the local storage with the backend storage to indicate a current account balance, passes, or status of a bill cycle.

8. The non-transitory computer-readable storage medium of claim 1, wherein the charging node is caused to:

generate, by a microservice interfacing the backend storage system, a notification indicative of a status of the session or an update of account status data, wherein the microservice is located at the charging node.

9. The non-transitory computer-readable storage medium of claim 1, wherein the charging node is caused to:

cause the backend storage system to remove data related to the session identifier stored in local storage systems of other charging nodes coupled to the backend storage system.

10. The non-transitory computer-readable storage medium of claim 1, wherein:

the subscriber account data is provisioned through a containerized agent interfacing the backend storage system; and the containerized agent is collocated with the backend storage system.

11. The non-transitory computer-readable storage medium of claim 1, wherein the subscriber account data is shared among a group of subscribers, and wherein the charging node is caused to:

cause the backend storage system to update counters that handle the subscriber account data of the group of subscribers;

cause the backend storage system to reserve units for the subscriber based on the subscriber account data retrieved from the backend storage system; and cause the backend storage system to deduct the reserve units from the subscriber account data, wherein the reserved units are not available to other subscribers that share the subscriber account data.

12. A method performed by a charging node of a telecommunications network, the method comprising:

receive, from a network node of the telecommunications network, a message related to delivery of a service to an end user device, wherein the message includes an indication of a session identifier for a session on which the service is delivered to the end user device, and wherein the end user device is associated with a subscriber of the telecommunications network;

search a local storage system of the charging node for the session identifier, wherein the local storage system is configured to store session identifiers for session-based charging, and wherein the session identifiers are associated with records of subscriber account data for multiple subscribers;

determine that the session identifier is absent from the local storage system of the charging node;

in response to the session identifier being absent from the local storage system, ignore a state of the session on which the service is delivered to the end user device;

reserve a number of service units based on a condition for providing the service to the subscriber, wherein a service unit corresponds to a standardized measure of consumption or use attributable to the service; and retrieve, based on the session identifier, subscriber account data from a remote storage system, wherein the remote storage system is communicatively coupled to multiple disparately located charging nodes that are configured for performing stateful and stateless charging, and wherein the remote storage system is configured to maintain subscriber account data of multiple subscribers collected from the multiple disparately located charging nodes, wherein the charging node is one of multiple charging nodes of a charging system having a refactorized architecture including multiple containers that each include one or more microservices, and wherein the message is received by the charging node from a microservice; and communicate, to the network node or the microservice, an indication of a number of granted service units for the end user device, wherein the number of granted service units is determined based on the subscriber account data retrieved from the remote storage system.

13. The method of claim 12, wherein the remote storage system is another local storage system of another charging node, and wherein the method further comprises, prior to retrieving the subscriber account data from the remote storage system:

identifying the other charging node as a most recent charging node storing the subscriber account data, wherein the other charging node is identified as a most recent charging node based on an account tracker function, and wherein the account tracker function tracks a location of subscriber account data of the subscriber among multiple charging nodes coupled to the telecommunications network.

14. The method of claim 12 further comprising:

determining a number of used service units associated with the session identifier; and synchronizing the number of used service units associated with the session identifier across the local storage system and the remote storage system.

15. The method of claim 12, wherein the remote storage system is a local storage system of another charging node that is georedundant of the charging node.

16. The method of claim 12, wherein the charging node is configured as a group of microservices in a cloud-native architecture.

17. A backend storage system, coupled to a telecommunications network, the backend storage system comprising:

at least one hardware processor; and at least one non-transitory memory storing instructions, which, when executed by the at least one hardware processor of a charging node of a telecommunications network, cause the charging node to:

receive, from a network node of the telecommunications network, a message related to delivery of a service over the telecommunications network to an end user device, wherein the message includes an indication of a session identifier for a session on which the service is delivered to the end user device, and wherein the end user device is associated with a subscriber of the telecommunications network;

search a local storage system of the charging node for the session identifier, wherein the local storage system is configured to store session identifiers for session-based charging, and wherein the session identifiers are associated with records of subscriber account data for multiple subscribers;

determine that the session identifier is absent from the local storage system of the charging node;

in response to the session identifier being absent from the local storage:

ignore a state of the session on which the service is delivered to the end user device;

reserve a number of service units based on a condition for providing the service to the subscriber, wherein a service unit corresponds to a standardized measure of consumption or use attributable to the service; and retrieve, based on the session identifier, subscriber account data from the backend storage system, wherein the backend storage system is communicatively coupled to multiple disparately located charging nodes that are configured for performing stateful and stateless charging, and wherein the backend storage system maintains records of subscriber account data of multiple subscribers collected from the multiple disparately located charging nodes, wherein the charging node is one of multiple charging nodes of a charging system having a refactorized architecture including multiple containers that each include one or more microservices, and wherein the message is received by the charging node from a microservice; and communicate, to the network node or the microservice, an indication of a number of granted service units for the end user device, wherein the number of granted service units is determined based on the subscriber account data retrieved from the backend storage system.

18. The backend storage system of claim 17, wherein the message is a first message, and wherein the charging node is further caused to:

store the session identifier at the local storage of the charging node in association with the subscriber account data retrieved from the backend storage system;

receive a second message related to delivery of the service to the end user device, wherein the message includes an indication of the session identifier for the session on which the service is being delivered to the end user device;

search the local storage system of the charging node for the session identifier;

identify the session identifier and associated subscriber account data stored at the local storage system;

in response to identifying the session identifier stored at the local storage system:

update the associated subscriber account data to indicate a number of used service units for the service; and search the backend storage system for updated subscriber account data; and output an indication of a new number of granted service units for the end user device, wherein the new number of granted service units is determined based on the updated subscriber account data.

19. The backend storage system of claim 17, wherein the charging node is further caused to:

store the session identifier at the local storage system of the charging node in association with the subscriber account data retrieved from the backend storage system;

receive a termination message related to terminating the service, wherein the termination message includes an indication of the session identifier for the session on which the service is being delivered to the end user device;

search the local storage system of the charging node for the session identifier;

identify the session identifier; and in response to identifying the session identifier stored at the local storage system:

remove the subscriber account data stored at the local storage of the charging node;

generate a charge record for the session; and communicate the charge record to a network node that sent the termination message to the charging node.

20. The backend storage system of claim 17, wherein the charging node is further caused to:

cause the backend storage system to remove data related to the session identifier stored in local storage systems of other charging nodes coupled to the backend storage system.

* * * * *